US009495610B2

(12) United States Patent
Nakagawa et al.

(10) Patent No.: US 9,495,610 B2
(45) Date of Patent: Nov. 15, 2016

(54) TECHNIQUE FOR PRESUMING POSITIONS OF ORGANS

(71) Applicants: FUJITSU LIMITED, Kawasaki-shi, Kanagawa (JP); The University of Tokyo, Tokyo (JP)

(72) Inventors: Machiko Nakagawa, Kawasaki (JP); Toshiaki Hisada, Tokyo (JP); (Continued)

(73) Assignees: FUJITSU LIMITED, Kawasaki (JP); The University of Tokyo, Tokyo (JP)

( * ) Notice: Subject to any disclaimer, the term of this patent is extended or adjusted under 35 U.S.C. 154(b) by 62 days.

(21) Appl. No.: 14/582,300

(22) Filed: Dec. 24, 2014

(65) Prior Publication Data

US 2015/0193930 A1 Jul. 9, 2015

(30) Foreign Application Priority Data

Jan. 9, 2014 (JP) ................................ 2014-002167

(51) Int. Cl.
*G06K 9/00* (2006.01)
*G06K 9/62* (2006.01)
(Continued)

(52) U.S. Cl.
CPC ......... *G06K 9/6201* (2013.01); *G06K 9/00201* (2013.01); *G06T 7/0012* (2013.01);
(Continued)

(58) Field of Classification Search
CPC .............. G06K 9/00201; G06K 9/6201; G06T 2207/10081; G06T 2207/10088; G06T
(Continued)

(56) References Cited

U.S. PATENT DOCUMENTS 6,728,424 B1 4/2004 Zhu et al.
2008/0123927 A1 * 5/2008 Miga .................... G06T 7/0032 382/131

FOREIGN PATENT DOCUMENTS

JP 8-287228 11/1996
JP 2004-508856 3/2004
JP 2007-209583 8/2007

OTHER PUBLICATIONS

Szymon Rusinkiewicz et al. "Efficient Variants of the ICP Algorithm", Proceedings of International Conference on 3-D Digital Imaging and Modeling, 2001, 8 pages.

* cited by examiner

*Primary Examiner* — Manuchehr Rahmjoo
(74) *Attorney, Agent, or Firm* — Oblon, McClelland, Maier & Neustadt, L.L.P.

(57) ABSTRACT

An apparatus for presuming positions of organs is configured to transform plural organs included in a template that is a model including the plural organs so as to match a predetermined target organ among the plural organs in the template to a corresponding organ in volume data; and perform a first processing and a second processing a predetermined number of times. The first processing includes transforming a first organ selected among the plural organs in the template according to a corresponding first organ in the volume data, and the second processing includes transforming, for each of second organs that are predetermined organs, which are influenced by transformation of the first organ, the second organ according to transformation performed for third organs that are predetermined organs, which influence the second organ in the template.

7 Claims, 16 Drawing Sheets

(72) Inventors: Seiryo Sugiura, Tokyo (JP); Takumi Washio, Tokyo (JP); Jun-ichi Okada, Tokyo (JP)

(51) Int. Cl.
*G06T 7/00* (2006.01)
*G06T 7/60* (2006.01)

(52) U.S. Cl.
CPC .......... *G06T 7/0046* (2013.01); *G06T 7/0081* (2013.01); *G06T 7/0091* (2013.01); *G06T 7/602* (2013.01); *G06T 2207/10081* (2013.01); *G06T 2207/10088* (2013.01); *G06T 2207/30008* (2013.01); *G06T 2207/30012* (2013.01); *G06T 2207/30061* (2013.01)

(58) Field of Classification Search
CPC .......... 2207/30008;G06T 2207/30012; G06T 2207/30061; G06T 7/0012; G06T 7/0046; G06T 7/0081; G06T 7/0091; G06T 7/602
USPC .......................................................... 382/119
See application file for complete search history.

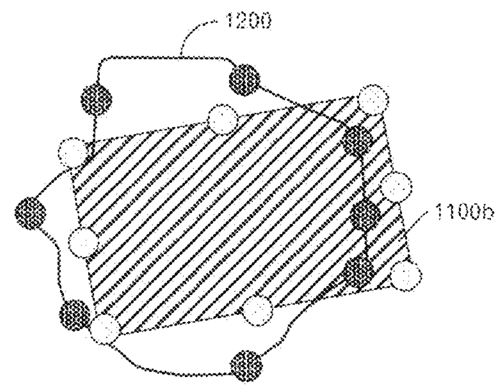
FIG.16
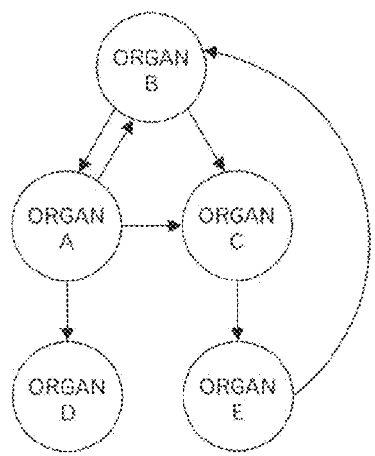
FIG.17
| | | SOURCE | | | | |
|---|---|---|---|---|---|---|
| | | ORGAN A | ORGAN B | ORGAN C | ORGAN D | ORGAN E |
| TARGET | ORGAN A | | ba | | | |
| | ORGAN B | ab | | | | eb |
| | ORGAN C | ac | bc | | | |
| | ORGAN D | ad | | | | |
| | ORGAN E | | | ce | | |
FIG.18

TECHNIQUE FOR PRESUMING POSITIONS OF ORGANS

CROSS-REFERENCE TO RELATED APPLICATIONS

This application is based upon and claims the benefit of priority of the prior Japanese Patent Application No. 2014-002167, filed on Jan. 9, 2014, the entire contents of which are incorporated herein by reference.

FIELD

This invention relates to a method and apparatus for presuming positions of organs or the like.

BACKGROUND

Recently, according to development and diversification of medical image diagnosis apparatuses such as a Magnetic Resonance Imaging (MRI) equipment and a Computed Tomography (CT) equipment, a data amount of medical tomographic images that were outputted, for one patient, by the MRI equipment or CT scanning equipment remarkably increases. Therefore, a burden of a doctor who extracts effective information from huge data and performs treatment, diagnosis and operation is also a problem.

Then, in order to reduce the burden of the doctor, attention is paid to various computer diagnosis support technique. As one element of the computer diagnosis support technique, there is position presumption of organs within the medical images. By automatically presuming the position of the organ whose appearance changes depending on the photographing principle of the MRI or CT scanning equipment and/or a photographing protocol concerning identification of a photographing target to which attention is to be paid within the organ, it becomes possible to perform presumption of the posture or interpolation of a missing portion, which is other than an organ cross section that is a scanning target within the MRI image or CT scanning image, such as an artifact that is a noise, which occurs based on the photographing principle of the MRI equipment or CT scanning equipment.

When extracting an organ shape from a medical image, it becomes possible to stably perform organ extraction by initially presuming a region of an organ to be extracted. However, when the photographed region of the medical image is insufficient and a portion of the organ to be extracted is not photographed, the position of the organ may not be identified with high accuracy. Moreover, there are organs whose position or the like cannot be easily identified from the MRI image or the like.

Patent Document 1: Japanese Laid-open Patent Publication No. 2004-508856

Patent Document 2: Japanese Laid-open Patent Publication No. 2007-209583

Patent Document 3: Japanese Laid-open Patent Publication No. 08-287228

Non-Patent Document 1: Szymon Rusinkiewicz, Marc Levoy, "Efficient Variants of the ICP Algorithm", Proceedings of International Conference on 3-D Digital Imaging and Modeling, pp. 145-152, 2001

SUMMARY

A method for presuming positions of organs, which relates to this invention, includes: (A) transforming plural organs included in a template that is a model including the plural organs so as to match a predetermined target organ among the plural organs in the template to a corresponding organ in volume data; and (B) performing a first processing and a second processing a predetermined number of times, wherein the first processing includes transforming a first organ selected among the plural organs in the template according to a corresponding first organ in the volume data, and the second processing includes transforming, for each of second organs that are predetermined organs, which are influenced by transformation of the first organ, the second organ according to transformation performed for third organs that are predetermined organs, which influence the second organ in the template.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 16 is a diagram to explain the registration processing;

FIG. 17 is a diagram depicting an example of an inter-organ graph;

FIG. 18 is a diagram depicting a data example of the inter-organ graph;

DESCRIPTION OF EMBODIMENTS

In this embodiment, by performing linear registration of a torso model (also called "template") that is a model including standard human chest and abdomen for image data such as an MRI image or CT image, the positions or the like of organs of a patient are presumed. Here, the registration is a processing to adjust the relative position between objects within the image, and the linear registration is registration by the linear conversion. The torso model is represented by polygons. Moreover, the template is not limited to the torso model, and may be a model of the head or underbelly.

Figure 1:
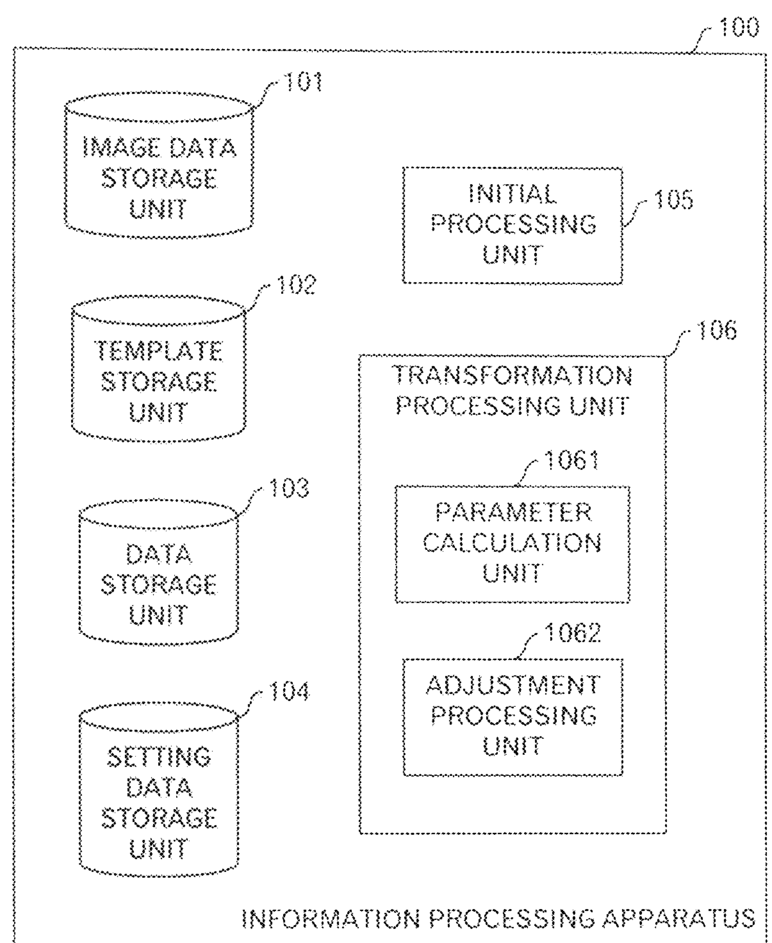
FIG. 1 illustrates a functional block diagram of an information processing apparatus relating to an embodiment of this invention.

Next, FIG. 1 illustrates a functional block configuration of an information processing apparatus 100 relating to this embodiment. The information processing apparatus 100 relating to this embodiment has an image data storage unit 101, a template storage unit 102, a data storage unit 103, a setting data storage unit 104, an initial processing unit 105, and a transformation processing unit 106.

The image data storage unit 101 stores image data that is generated by a region segmentation according to an arbitrary method from the medical image (here, volume data). The region segmentation means that the medical image is divided into regions of the image based on predetermined thresholds. A representative method of the region segmentation is a Region growing method. The Region growing method is a following method: An arbitrary point is set as a starting point of a region to be extracted, and when its neighboring pixel satisfies an expansion condition, the region expands to the neighboring pixel as an own region. Furthermore, a neighboring pixel of the expanded region is referenced, and until no pixel that satisfies the expansion condition is found, the region is expanded to presume the region. Accordingly, data is obtained that the medical image is divided into several regions.

Moreover, the template storage unit 102 stores data of the torso model that is represented by polygons. Furthermore, the data storage unit 103 stores data in the processing and processing results.

Moreover, the setting data storage unit 104 stores data of an inter-organ graph. The inter-organ graph is a directed graph that represents a relationship among organs. Specifically, the inter-organ graph represents how much transformation of a certain organ influences which organ. The degree of the influence is represented by a weight value. The detailed explanation will be made later. In addition, the setting data storage unit 104 stores various thresholds used in the following processing.

The initial processing unit 105 uses, as a reference organ that is an organ to be referenced, a lung among organs, for example, to transform a lung in the template so as to match the lung in the template to the position of the lung in the image data. And the initial processing unit 105 performs the similar transformation for other organs in the template. Moreover, the initial processing unit 105 calculates parameters in quartic functions for the template and the image data also for the vertebra, and performs initial registration.

The transformation processing unit 106 has a parameter calculation unit 1061 and an adjustment processing unit 1062. The parameter calculation unit 1061 performs, for each organ, a processing to transform a corresponding organ in the template according to a relationship between the template and the image data. The adjustment processing unit 1062 performs a processing to transform, based on the inter-organ graph, an influenced organ that is influenced from the transformation of a certain organ, according to the transformation that is made for an influencing organ that influences the influenced organ.

Next, processing contents of this information processing apparatus 100 will be explained by using FIGS. 2 to 23.

Figure 2:
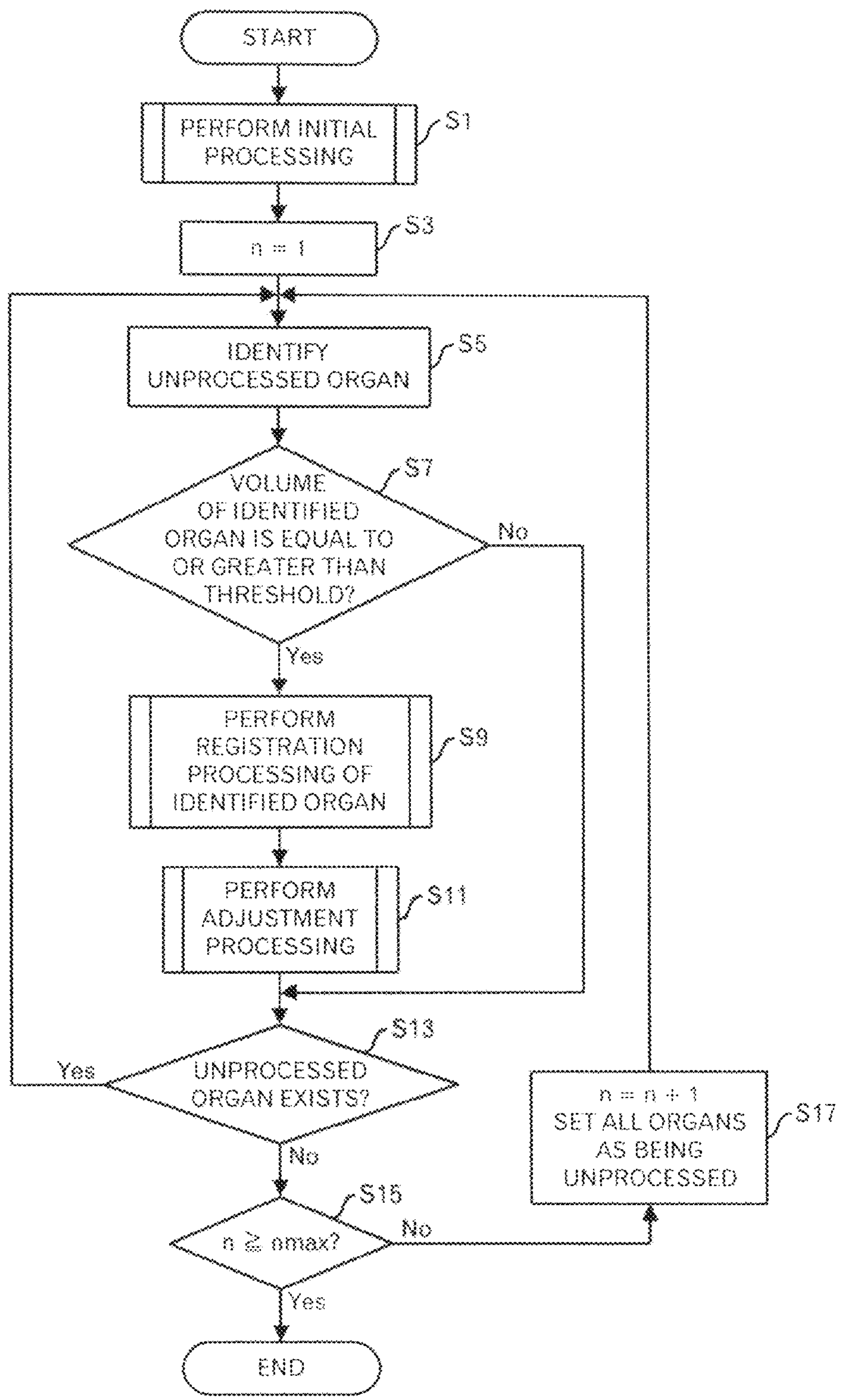
FIG. 2 is a diagram illustrating a main processing flow relating to the embodiment.

Firstly, the initial processing unit 105 performs an initial processing for the template stored in the template storage unit 102 (FIG. 2: step S1). The initial processing will be explained by using FIGS. 3 to 12.

Figure 3:
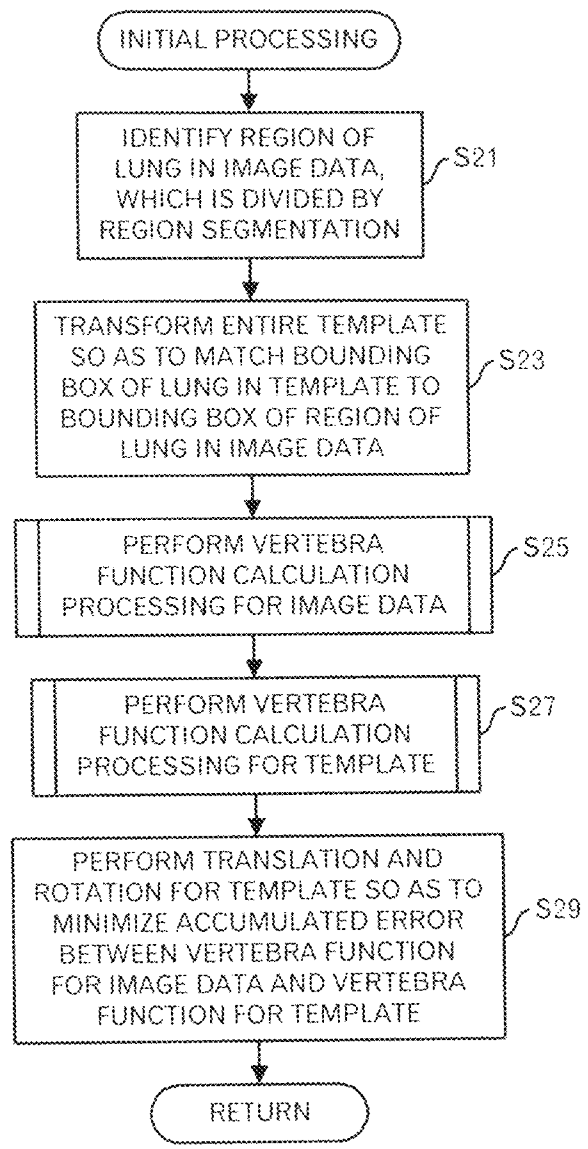
FIG. 3 is a diagram depicting a processing flow of an initial processing.

Firstly, the initial processing unit 105 identifies a region of a lung in the image data, for which the region segmentation has been performed, and which is stored in the image data storage unit 101 (FIG. 3: step S21). The lung and bone are relatively easily extracted by the region segmentation. Therefore, firstly, the region of the lung is identified.

Then, the initial processing unit 105 transforms the entire template so as to match the bounding box of the lung in the template to the bounding box of the identified region of the lung (step S23). The bounding box is identified by 6 coordinate values that are the minimum values and the maximum values in XYZ axes for a predetermined cubic region. Moreover, the transformation includes expansion or reduction, translation and/or rotation, when the volume of the identified region of the lung is equal to or greater than the threshold. However, because there is a case where the image data does not sufficiently include the lung, when the volume of the region of the lung is less than the threshold, only translation and/or rotation is performed.

After that, the initial processing unit 105 performs a vertebra function calculation processing for the image data (step S25). The vertebra function calculation processing will be explained by using FIGS. 4 to 12.

In this embodiment, the vertebra is approximated by the quartic function for which n=4 is set. Z axis represents a body-axis direction.

$$x(t) = \sum_{i=0}^{n} a_{xi} t^i \qquad (1)$$

$$y(t) = \sum_{i=0}^{n} a_{yi} t^i$$

$$z(t) = t$$

In the vertebra function calculation processing, coefficients in the expression (1) are calculated. A well-known method such as the least squares method may be employed as the specific algorithm.

Figure 4:
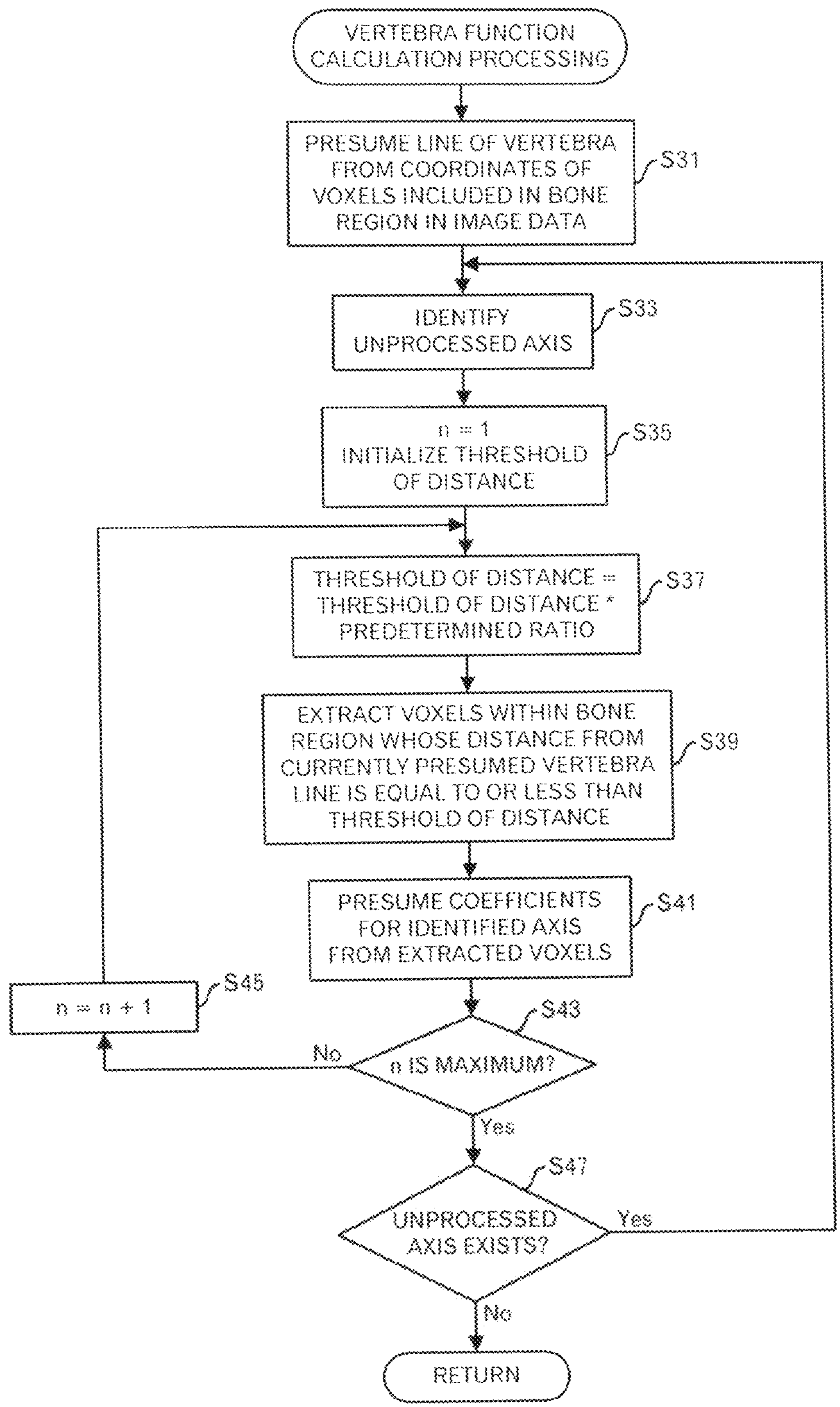
FIG. 4 is a diagram depicting a processing flow of a vertebra function calculation processing.

The initial processing unit 105 presumes a line of the vertebra (i.e. the coefficients of the expression (1)) from coordinates of voxels included in the bone region in the image data (FIG. 4: step S31).

Figure 5:
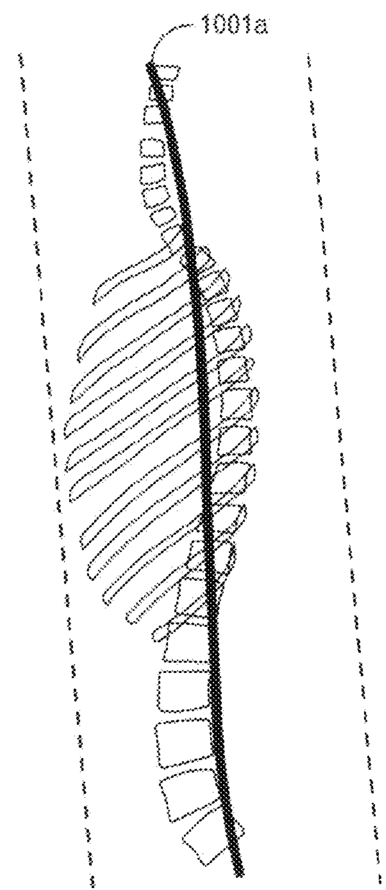
FIG. 5 is a diagram to explain the vertebra function calculation processing.
Figure 6:
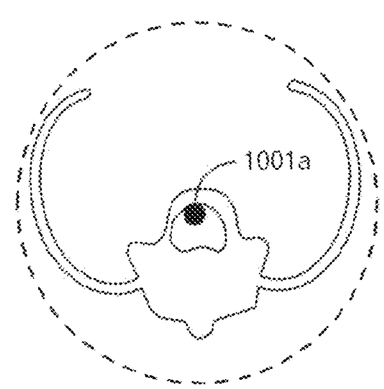
FIG. 6 is a diagram to explain the vertebra function calculation processing.

Because the bone region in the image data includes regions other than the vertebra such as the rib and the collarbone, it is preferable that the bone region is presumed after removing the regions other than the vertebra. However, because it is difficult to properly remove the regions other than the vertebra from the first state, the line of the vertebra is preliminary determined by using coordinates of all voxels that represent the bone region in the image data, firstly. For example, FIG. 5 is a diagram schematically illustrating a side surface of the image data, and the thick line represents a vertebra line 1001*a* that represents the vertebra. FIG. 6 depicts a certain cross section that is perpendicular to the body axis, and also in this figure, the black circle represents the vertebra line 1001*a* that represents the vertebra.

After that, the initial processing unit 105 identifies an unprocessed axis among X axis and Y axis (step S33). Moreover, the initial processing unit 105 initializes a counter n by "1" and sets an initial value to a threshold of a distance used in the following processing (step S35).

Then, the initial processing unit 105 calculates the threshold of the distance by multiplying a previous threshold of the distance by a predetermined ratio that is less than "1" (step S37). Then, the initial processing unit 105 extracts voxels within the bone region, whose distance from the present presumed vertebra line is equal to or less than the threshold of the distance (step S39). For example, in the state of FIGS. 5 and 6, the voxels within the bone region, which are included in a range surrounded by dotted lines, which represent a constant distance from the vertebra line 1001*a*, are extracted.

After that, the initial processing unit 105 calculates coefficients for the axis identified at the step S33 from the extracted voxels (step S41). For example, the vertebra line 1000*b* as illustrated in FIGS. 7 and 8 is calculated.

Then, the initial processing unit 105 determines whether or not the value of the counter n is equal to or greater than the predetermined maximum value (step S43). When the value of the counter n is less than the predetermined maximum value, the initial processing unit 105 increments the counter n by "1" (step S45), and the processing returns to the step S37.

On the other hand, when the value of the counter n reached the maximum value, the initial processing unit 105 determines whether or not there is an unprocessed axis (step S47). When there is an unprocessed axis, the processing returns to the step S33. On the other hand, when there is no unprocessed axis, the processing returns to a calling-source processing.

Figure 7:
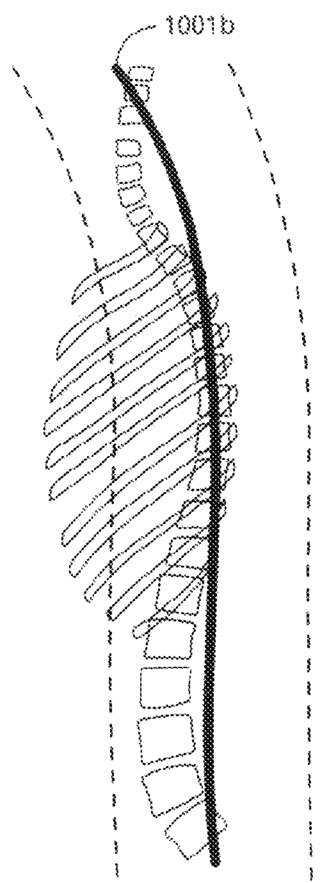
FIG. 7 is a diagram to explain the vertebra function calculation processing.
Figure 8:
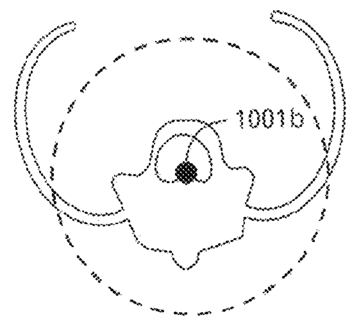
FIG. 8 is a diagram to explain the vertebra function calculation processing.
Figure 9:
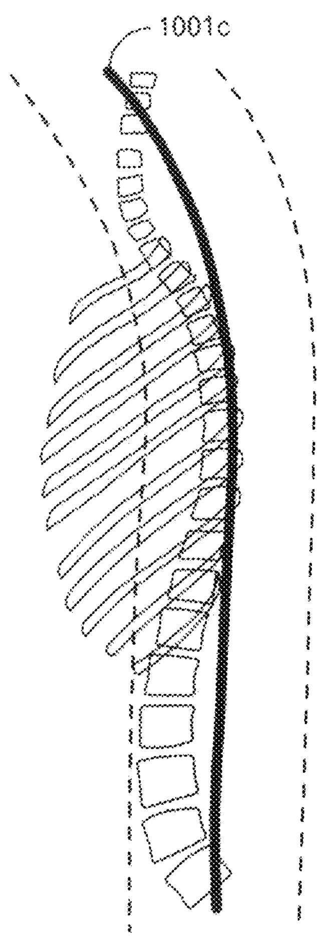
FIG. 9 is a diagram to explain the vertebra function calculation processing.
Figure 10:
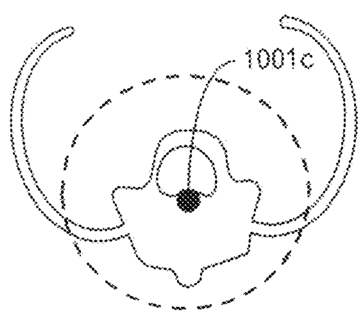
FIG. 10 is a diagram to explain the vertebra function calculation processing.
Figure 11:
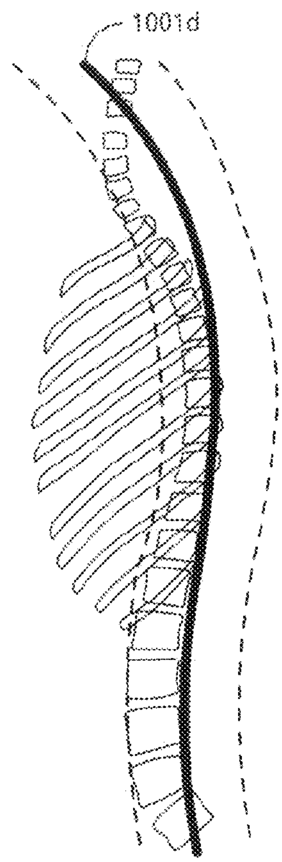
FIG. 11 is a diagram to explain the vertebra function calculation processing.
Figure 12:
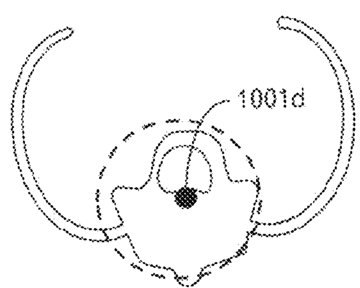
FIG. 12 is a diagram to explain the vertebra function calculation processing.

In the repetition of the aforementioned processing, when the vertebra line 1001*b* in FIGS. 7 and 8 is calculated, a range depicted by the dotted lines becomes the extraction range of the voxels. When the vertebra line 1001*c* is calculated in this extraction range, the vertebra line 1001*c* is as illustrated in FIGS. 9 and 10. Here, the extraction range (depicted by the dotted line) is narrowed again. When the vertebra line 1001*d* is calculated in this extraction range, the vertebra line 1001*d* is as illustrated in FIGS. 11 and 12. The range of the voxels to be used in the next stage is the range represented by the dotted lines in FIGS. 11 and 12. Such a processing is repeated the predetermined number of times.

Returning to the explanation of the processing in FIG. 3, the initial processing unit 105 performs a vertebra function calculation processing for the template (step S27). Although an example was explained in the processing in FIG. 4 that the processing is performed for the voxel data, a processing that is changed with extracting pertinent polygons instead of the voxel data is performed during this step because the template is represented by polygons.

Then, the initial processing unit 105 performs translation and/or rotation for the template so as to minimize an accumulated error between the vertebra function for the image data and the vertebra function for the template (step S29).

Thus, the position of the entire template is preliminarily adjusted.

Returning to the explanation of the processing in FIG. 2, the transformation processing unit 106 initializes a counter n by "1" (step S3). Moreover, the transformation processing unit 106 identifies one unprocessed target organ among organs identified by the region segmentation in the image data (step S5). Then, the transformation processing unit 106 determines whether or not the volume of the target organ in the image data is equal to or greater than a threshold predetermined for the target organ (step S7). The organ itself outside the photographed region is treated as an organ not being transformed. Therefore, when the volume of the target organ is less than the threshold, the processing shifts to step S13.

On the other hand, when the volume of the target organ is equal to or greater than the threshold, the parameter calculation unit 1061 performs a registration processing of the identified organ (step S9). The registration processing will be explained by using FIGS. 13 to 16.

The registration processing is performed based on the Iterative Closest Point (ICP) algorithm (See "Szymon Rusinkiewicz, Marc Levoy, "Efficient Variants of the ICP Algorithm", Proceedings of International Conference on 3-D Digital Imaging and Modeling, pp. 145-152, 2001").

Figure 13:
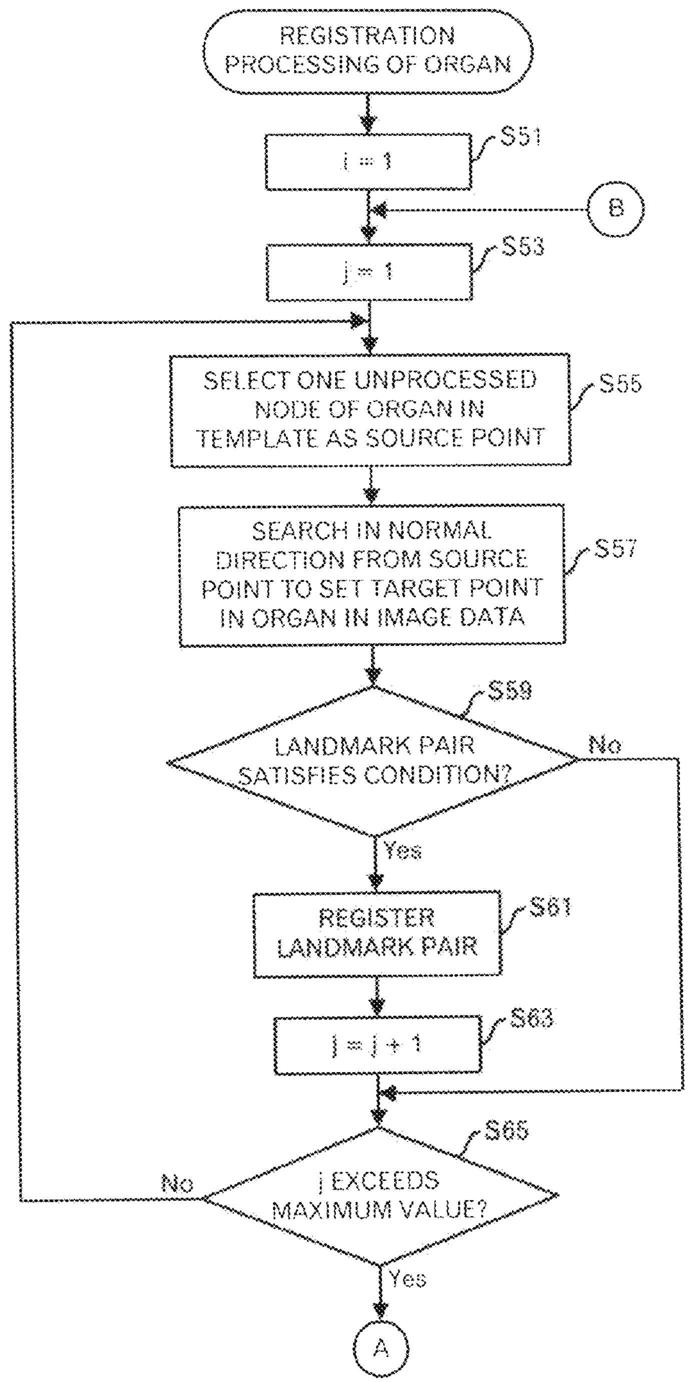
FIG. 13 is a diagram depicting a processing flow of a registration processing.

Firstly, the parameter calculation unit 1061 initializes a value of a counter i for the number of times of the repetition by "1" (FIG. 13: step S51). Moreover, the parameter calculation unit 1061 initializes a value of a counter j for the number of landmark pairs, each of which includes a source point and a target point, by "1" (step S53).

Figure 14:
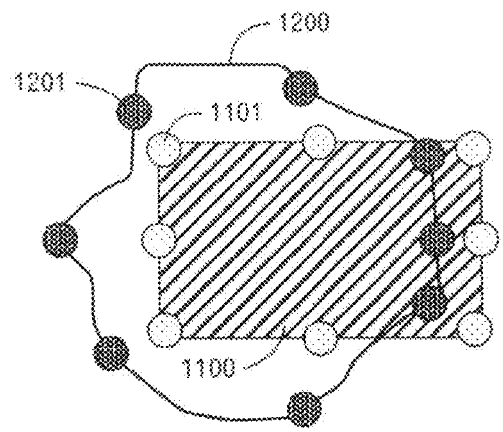
FIG. 14 is a diagram to explain the registration processing.

Then, the parameter calculation unit 1061 selects one unprocessed node of the organ identified at the step S5 in the template as a source point (step S55). For example, when it is assumed that a rectangle 1100 in FIG. 14 is one organ of the template, any one node (a circle. for example, 1101) of nodes on a boundary of its brightness region is selected.

Moreover, the parameter calculation unit 1061 performs searching in the normal direction from the source point to set a target point for a crossing point (a circle. For example, 1201) with a boundary 1200 of the corresponding organ in the image data (step S57).

Then, the parameter calculation unit 1061 determines whether or not the landmark pair including the source point and the target point satisfies a predetermined condition (step S59). The first condition in the predetermined condition is that the distance between the target point and the source point is equal to or less than a predetermined threshold. This is used in order to avoid a case in which the target point crosses a farther boundary instead of a nearer boundary. Moreover, the second condition in the predetermined condition is that the target point and source point are located from a target point or source point, which relates to the landmark pair that has been registered for the organ to be processed at a predetermined distance or more. When the landmark pairs are concentrated, the registration is not appropriately performed.

When the landmark pair does not satisfy the condition, the processing shifts to step S65. On the other hand, when the landmark pair satisfies the condition, the parameter calculation unit 1061 registers that landmark pair (step S61). Then, the parameter calculation unit 1061 increments j by Will (step S63).

After that, the parameter calculation unit 1061 determines whether or not j exceeds the predetermined maximum value of j (step S65). When j does not exceed the maximum value of j, the processing returns to step S55. On the other hand, when j exceeds the maximum value of j, the processing shifts to a processing in FIG. 15 through terminal A.

Figure 15:
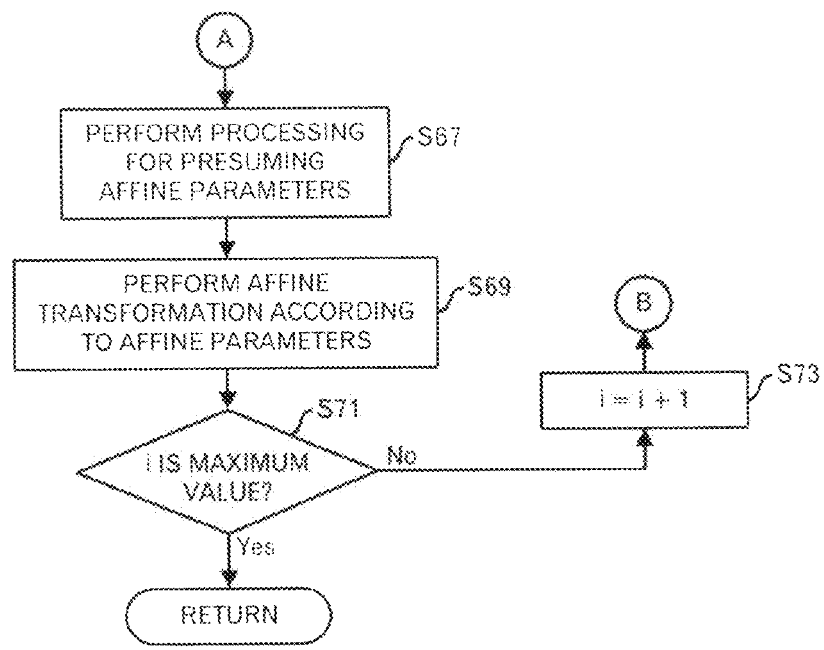
FIG. 15 is a diagram depicting a processing flow of the registration processing.

Shifting to the processing in FIG. 15, the parameter calculation unit 1061 performs a processing to presume affine parameters according to a following expression (step S67).

The affine parameters are parameters for scaling, rotation and translation, and are represented by s, r and t.

$$E(s, r, t) = \underset{s,r,t}{\operatorname{argmin}}\left\{\sum_{i=0}^{n} \|(sR(x_i, r) + t) - y_i\|^2\right\}$$

In this expression, affine parameters are calculated, which are linear conversion parameters that minimize the square sum or sum of distances between a target point $y_i$ and a source point $x_i$ after the linear conversion. R(x, r) is a function to rotate the coordinates x by "r". n represents the number of registered landmark pairs. As the method for calculating such an expression, any conventional method may be employed.

In an example of FIG. 14, the rectangle 1100*b* is generated by expanding or reducing, rotating and/or translating the rectangle 1100 as illustrated in FIG. 16, for example.

Then, the transformation processing unit 106 performs affine transformation for each node of the organ identified at the step S5 in the template according to the calculated affine parameters, and stores processing results in the data storage unit 103 (step S69).

Moreover, the parameter calculation unit 1061 determines whether or not the value of the counter i reached the maximum value of i (step S71). When the value of the counter i does not reach the maximum value, the parameter calculation unit 1061 increments i by "1" (step S73), and the processing returns to the step S53 in FIG. 13 through terminal B.

By performing such a processing, the organ in the template is gradually adjusted to the organ in the image data.

Returning to the explanation of the processing in FIG. 2, the adjustment processing unit 1062 performs an adjustment processing (step S11). At the step S9, when the volume of the identified organ is not equal to or greater than the threshold, the processing is not performed. However, at this step, even if the aforementioned condition is not satisfied, the adjustment processing is performed when the transformation of the identified organ is influenced. The adjustment processing will be explained by using FIGS. 17 to 23.

In this embodiment, a processing is performed based on the inter-organ graph stored in the setting data storage unit 104. An example of the inter-organ graph is illustrated in FIG. 17. Here, the relationship among 5 organs from organ A to organ E is illustrated, and an arrow represents a direction from an influence source to an influence destination. In addition, a weight value is set for each arrow. More specifically, data as illustrated in FIG. 18 is stored in the setting data storage unit 104, for example. In FIG. 18, a link is provided for a pair of organs for which the weight value is set. The weight value from the organ A to the organ B may be different from the weight value from the organ B to the organ A.

Figure 19:
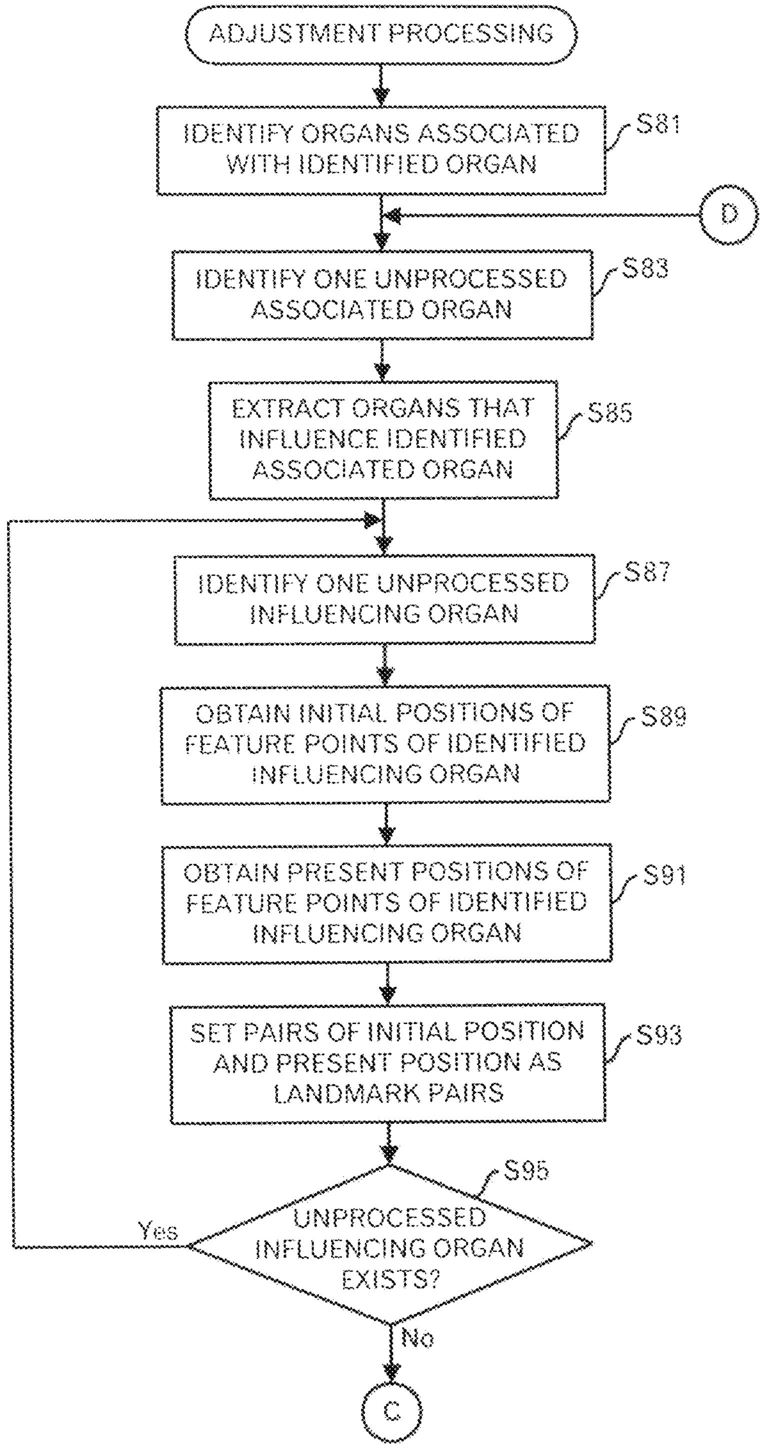
FIG. 19 is a diagram depicting a processing flow of an adjustment processing.

The adjustment processing unit 1062 identifies an associated organ that is an organ associated with the organ identified at the step S5 (FIG. 19: step S81). When the organ A is the identified organ in the inter-organ graph in FIG. 17, the organs B, C and D, which are the destinations of the arrows from the organ A, are identified as the associated organs.

Figure 20:
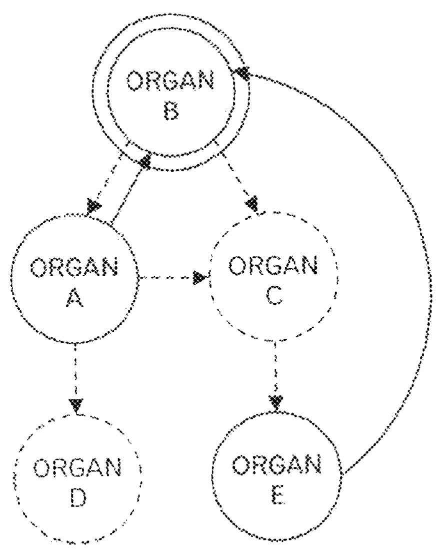
FIG. 20 is a diagram depicting an example of an influencing organ to organ B.
Figure 21:
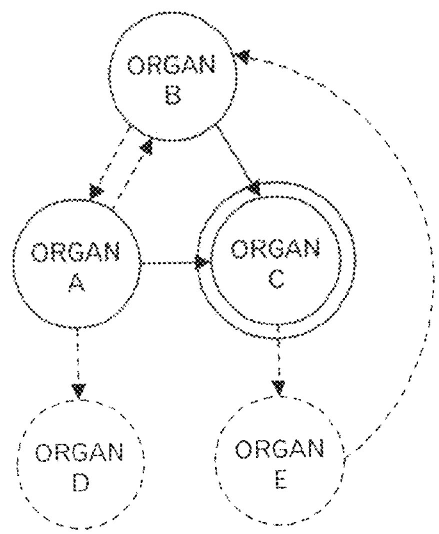
FIG. 21 is a diagram depicting an example of an influencing organ to organ C.
Figure 22:
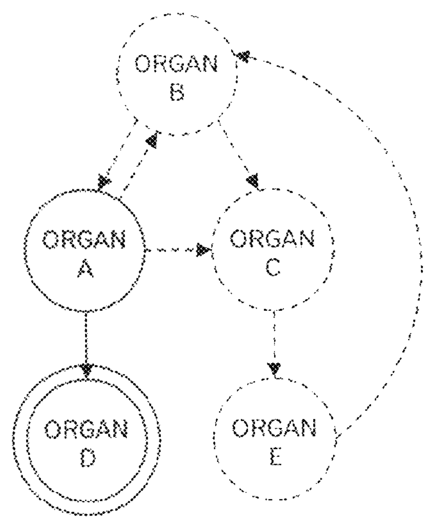
FIG. 22 is a diagram depicting an example of an influencing organ to organ D.

After that, the adjustment processing unit 1062 identifies one unprocessed associated organ among the associated organs identified at the step S81 (step S83). The adjustment processing unit 1062 extracts an organ (hereinafter, referred to an influencing organ or influence-source organ) that influences the identified associated organ (step S85). For example, when the organ B is identified as the associated organ, the organ that influences the organ B is an organ, which is a source of an arrow that designates the organ B in the inter-organ graph of FIG. 17. As illustrated in FIG. 20, they are the organs A and E. Similarly, when the organ C is identified as the associated organ, the organ that influences the organ C is an organ, which is a source of an arrow that designates the organ C in the inter-organ graph of FIG. 17. As illustrated in FIG. 21, they are the organs A and B. Furthermore, when the organ D is identified as the associated organ, the organ that influences the organ D is an organ, which is a source of an arrow that the organ D in the inter-organ graph of FIG. 17. As illustrated in FIG. 22, that is only the organ A.

The adjustment processing unit 1062 identifies one unprocessed influencing organ among the identified influencing organs (step S87). Then, the adjustment processing unit 1062 reads out initial positions $x_i$ of feature points of the identified influencing organ from the template storage unit 102 (step S89). The feature points are points predetermined based on anatomic features.

Moreover, the adjustment processing unit 1062 reads out present positions $y_i$ of the feature points of the identified influencing organ from the data storage unit 103 (step S91). The results of the linear conversion that has been performed up to this are obtained.

Then, the adjustment processing unit 1062 sets a pair of the initial position $x_i$ and present position $y_i$ as the landmark pair (step S93).

After that, the adjustment processing unit 1062 determines whether or not there is an unprocessed influencing organ (step S95). When there is an unprocessed influencing organ, the processing returns to the step S87. On the other hand, when there is no unprocessed influencing organ, the processing shifts to a processing in FIG. 23 through terminal C.

As described above, a landmark pair of each influencing organ is extracted for the associated organ.

Figure 23:
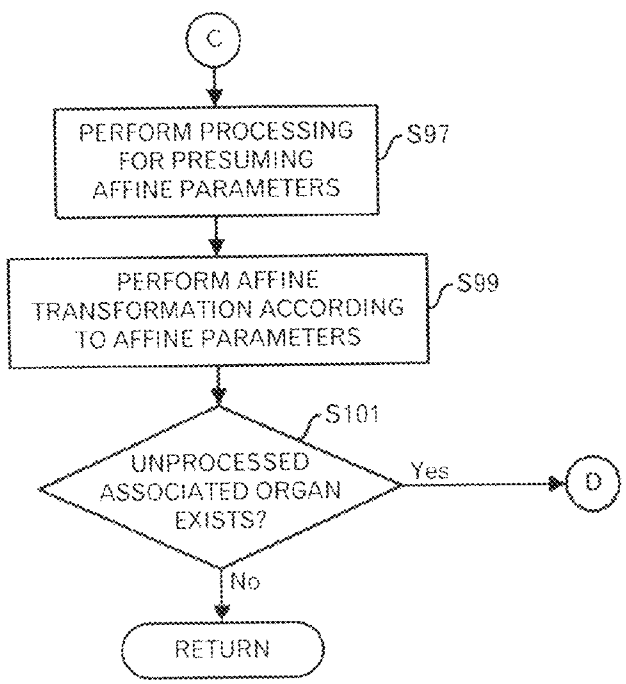
FIG. 23 is a diagram depicting a processing flow of the adjustment processing.

Shifting to the explanation of the processing in FIG. 23, the adjustment processing unit 1062 performs a processing for presuming affine parameters by using the landmark pair (step S97).

$$E(s, r, t) = \underset{s,r,t}{\operatorname{argmin}}\left\{\sum_{i=0}^{n} \|(sR(x_i, r) + t) - y_i\|^2\right\}$$

Here, $\alpha_i$ is a weight value from the influencing organ to the associated organ for the landmark pair i. Moreover, it is assumed that n landmark pairs are detected. Thus, the affine parameters for the influencing organ are obtained that are parameters of the affine transformation from the initial position to the present position. Any conventional method for solving this expression may be employed.

Then, the adjustment processing unit 1062 performs the affine transformation for the associated organ according to the calculated affine parameters, and stores processing results in the data storage unit 103 (step S99). Here, the initial position of each node of the associated organ is converted by the affine transformation.

The adjustment processing unit 1062 determines whether or not there is an unprocessed associated organ (step S101), and when there is an unprocessed associated organ, the processing returns to the step S83 in FIG. 19 through terminal D. On the other hand, when there is no unprocessed associated organ, the processing returns to the calling-source processing.

As described above, by transforming the associated organ so as to conform with the transformation of another organ, it is possible to prevent from being largely different by the noise such as artifacts in the region extracted from the image data. Moreover, the position of the organ, which is partially photographed, can be presumed along with the physique of the entire template (i.e. torso model).

Returning to the explanation of the processing in FIG. 2, the transformation processing unit 106 determines whether or not there is an unprocessed organ (step S13). When there is an unprocessed organ, the processing returns to the step S5. On the other hand, when there is an unprocessed organ, the transformation processing unit 106 determines whether or not the value of the counter n is equal to or greater than nmax, which is the maximum value of n (step S15). When n is equal to or greater than nmax, the processing ends. On the other hand, when n is less than nmax, the transformation processing unit 106 increments n by "1", and sets all organs as being unprocessed (step S17). Then, the processing returns to the step S5.

By performing the aforementioned processing, the linear conversion is performed so that the template conforms with the image data.

Figure 24:
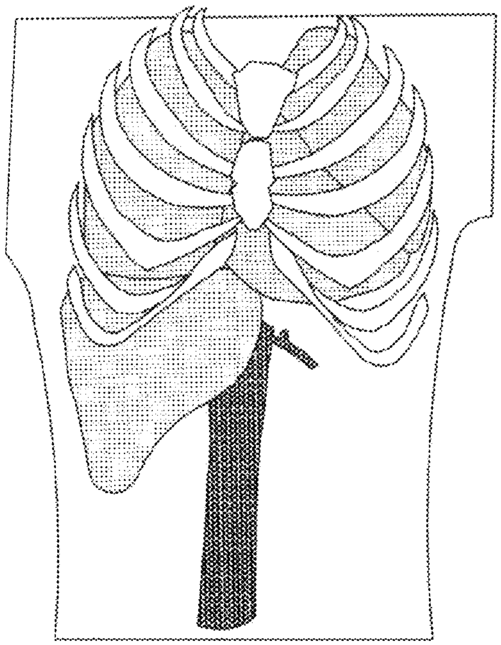
FIG. 24 is a diagram depicting an example of a template.
Figure 25:
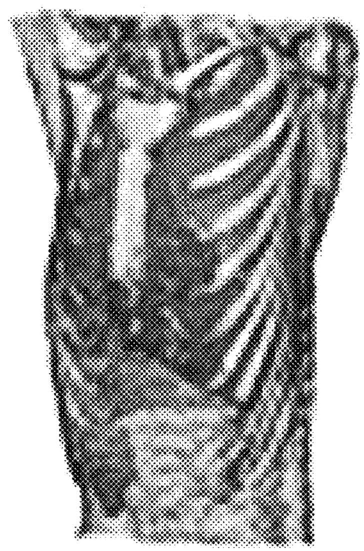
FIG. 25 is a diagram depicting an example of image data.
Figure 26:
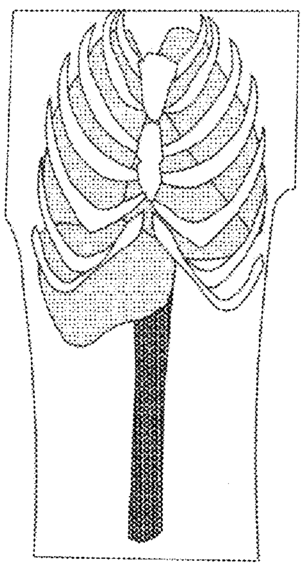
FIG. 26 is a diagram depicting an example of a template after transformation.

For example, when the linear registration regarding organs of the image data as illustrated in FIG. 25 is performed for the template as illustrated in FIG. 24, results as illustrated in FIG. 26 are obtained. In the image data illustrated in FIG. 25, the organs of a slender patient are illustrated, and organs in the template are converted to be slender so as to conform with the organs in the image data.

Although the embodiments of the invention were explained, the invention is not limited to those. For example, the functional block diagram depicted in FIG. 1 is a mere example, and does not correspond to a program module configuration and file configuration. Furthermore, as for the processing flow, as long as the processing results do not change, the turns of the steps may be exchanged or plural steps may be executed in parallel.

Figure 27:
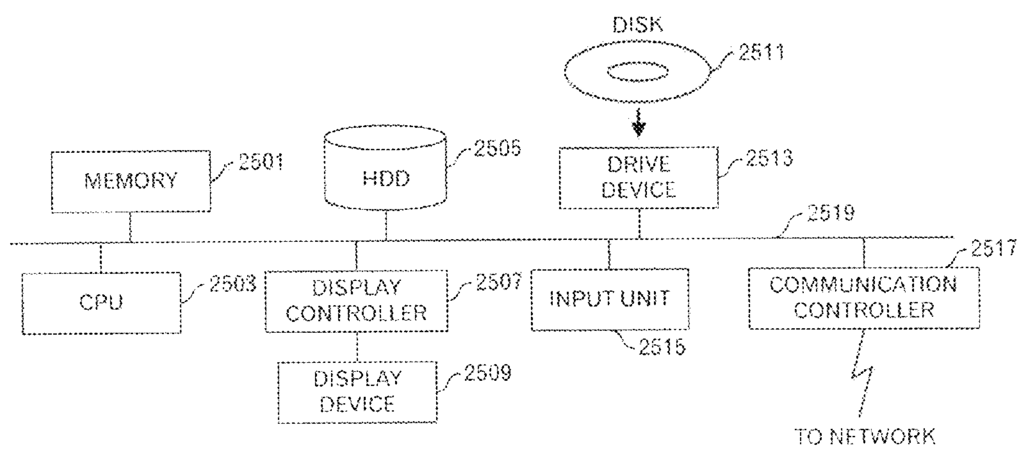
FIG. 27 is a functional block diagram of a computer.

In addition, the aforementioned information processing apparatus 100 is a computer device as shown in FIG. 27. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as shown in FIG. 27. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

An information processing method relating to the embodiments includes: (A) first transforming plural organs included in a template so as to match a predetermined target organ among the plural organs in the template to a corresponding organ among plural organs identified from volume data; and (B) performing a first processing and a second processing a predetermined number of times. The first processing includes second transforming at least one first organ of the plural organs in the template according to a corresponding first organ in the volume data, and the second processing includes third transforming, based on data, which is stored in a data storage unit, for another organ that is influenced by transformation of an organ and for each of second organs (e.g. influenced organs) that are influenced by transformation of the first organ, the second organ according to transformation performed for third organs (e.g. influencing organs) in the template, which influence the second organ.

By performing the aforementioned processing, the positions of the organs and the like are adjusted entirely by transforming organs associated with an organ to which attention is paid according to the transformation of organs that influence the associated organs. Therefore, it is possible to obtain appropriate positions of the organs. The transformation mainly represents the linear conversion, and includes scaling, translation and rotation.

Then, the aforementioned first processing may include: calculating affine parameters that make a total distance shortest, wherein the total distance is calculated by adding, with respect to plural points included in the target organ, a distance between a position after converting a position of a point of the target organ in the template with the affine parameters and a position of a corresponding point of the corresponding organ in the volume data; and transforming the target organ by using the affine parameters. The positions and the like are defined by the affine parameters for the organs in the template.

Moreover, the aforementioned second processing may include: calculating, for each of the second organs, affine parameters that make a total distance shortest, wherein the total distance is calculated by adding, with respect to plural points included in the third organs, a distance between a position after converting an initial position of each point among the plural points with the affine parameters and a present position of each point among the plural points; and transforming the second organ in an initial state by using the affine parameters. The adjustment of the positions and the like is performed by the affine parameters.

Furthermore, the data may include a weight value set between organs. In such a case, the aforementioned distance may be weighted by the weight value between the second organ and the third organ. This is because there are close and sparse relationships between organs.

Furthermore, the information processing method may further include: (C) calculating a first function that represents a vertebra identified from the volume data while narrowing voxel data used in the volume data; (D) calculating a second function that represents a vertebra identified from the template while narrowing polygons used in the template; and (E) performing translation and rotation so as to match the vertebra represented by the second function to the vertebra represented by the first function. The positions of the vertebra or the like can be adjusted.

In addition, in the information processing method, an organ whose volume identified from the volume data is less than a threshold is excluded from the plural organs to be processed. This is because it is difficult to determine the positions or the like with high accuracy.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus for performing linear registration of organs, comprising:

a memory; and a processor coupled to the memory and configured to:

first transform a predetermined target organ among a plurality of organs included in a template so as to match the predetermined target organ to an organ that corresponds to the predetermined target organ and is included in volume data that includes organs corresponding to the plurality of organs;

second transform, according to the predetermined target organ, organs that are other than the predetermined target organ and are included in the template; and perform a first processing and a second processing a predetermined number of times, wherein the first processing comprises:

calculating first affine parameters that minimize a total distance calculated by adding, with respect to a first plurality of points included in a first organ among the plurality of organs in the template, a distance between a first position and a second position, wherein the first position is a position after converting, with the first affine parameters, a position of a first point that is included in the first organ, and the second position is a position of a point that corresponds to the first point and is included in an organ that corresponds to the first organ and is included in the volume data; and performing scaling, rotation and translation for the first organ according to the first affine parameters, and the second processing comprises third transforming, for each of second organs which are influenced by the scaling, the rotation and the translation that were performed for the first organ, the second organ according to transformation performed for third organs which influence the second organ in the template.

2. The apparatus as set forth in claim 1, wherein the second processing comprises:

calculating, for each of the second organs, second affine parameters that minimize a total distance calculated by adding, with respect to a second plurality of points included in the third organs, a distance between a third position and a fourth position, wherein the third position is a position after converting, with the second affine parameters, an initial position of each point among the second plurality of points, and the fourth position is a present position of each point among the second plurality of points; and performing scaling, rotation and translation for each of the second organs in an initial state by using the second affine parameters calculated for the second organ, wherein the initial state is a state where scaling, rotation and translation have not been performed.

3. The apparatus as set forth in claim 2, wherein the distance between the third position and the fourth position is weighted by a predetermined weight value between the second organ and a third organ of the third organs, which includes a point located in the fourth position.

4. The apparatus as set forth in claim 1, wherein the processor is further configured to:

calculate a first line that represents a vertebra identified from the volume data while narrowing voxel data used in the volume data;

calculate a second line that represents a vertebra identified from the template while narrowing polygons used in the template; and match the second line to the first line.

5. The apparatus as set forth in claim 1, wherein the first processing comprises excluding an organ whose volume is less than a threshold from the plurality of organs to be processed.

6. A method for performing linear registration of organs, the method comprising:

first transforming, by using a computer, a predetermined target organ among a plurality of organs included in a template so as to match the predetermined target organ to an organ that corresponds to the predetermined target organ and is included in volume data that includes organs corresponding to the plurality of organs;

second transforming, by using the computer and according to the predetermined target organ, organs that are other than the predetermined target organ and are included in the template; and performing, by using the computer, a first processing and a second processing a predetermined number of times, wherein the first processing comprises:

calculating affine parameters that minimize a total distance calculated by adding, with respect to a plurality of points included in a first organ among the plurality of organs in the template, a distance between a first position and a second position, wherein the first position is a position after converting, with the affine parameters, a position of a first point that is included in the first organ, and the second position is a position of a point that corresponds to the first point and is included in an organ that corresponds to the first organ and is included in the volume data; and performing scaling, rotation and translation for the first organ according to the affine parameters, and the second processing comprises third transforming, for each of second organs which are influenced by the scaling, the rotation and the translation that were performed for the first organ, the second organ according to transformation performed for third organs which influence the second organ in the template.

7. A non-transitory computer-readable storage medium storing a program for causing a computer to execute a process, the process comprising:

first transforming a predetermined target organ among a plurality of organs included in a template so as to match the predetermined target organ to an organ that corresponds to the predetermined target organ and is included in volume data that includes organs corresponding to the plurality of organs;

second transforming, according to the predetermined target organ, organs that are other than the predetermined target organ and are included in the template; and performing a first processing and a second processing a predetermined number of times, wherein the first processing comprises:

calculating affine parameters that minimize a total distance calculated by adding, with respect to a plurality of points included in a first organ among the plurality of organs in the template, a distance between a first position and a second position, wherein the first position is a position after converting, with the affine parameters, a position of a first point that is included in the first organ, and the second position is a position of a point that corresponds to the first point and is included in an organ that corresponds to the first organ and is included in the volume data; and performing scaling, rotation and translation for the first organ according to the affine parameters, and the second processing comprises third transforming, for each of second organs which are influenced by the scaling, the rotation and the translation that were performed for the first organ, the second organ according to transformation performed for third organs which influence the second organ in the template.

* * * * *